United States Patent
Hirata (10) Patent No.: US 9,837,877 B2
(45) Date of Patent: Dec. 5, 2017

(54) ELECTRIC POWER TOOL

(71) Applicant: MAKITA CORPORATION, Anjo-shi, Aichi (JP)

(72) Inventor: Yusuke Hirata, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 340 days.

(21) Appl. No.: 14/696,612

(22) Filed: Apr. 27, 2015

(65) Prior Publication Data

US 2015/0326098 A1 Nov. 12, 2015

(30) Foreign Application Priority Data

May 9, 2014 (JP) .................................. 2014-097688

(51) Int. Cl.
| | |
|---|---|
| *H02K 11/02* | (2016.01) |
| *H02K 7/14* | (2006.01) |
| *H02K 23/66* | (2006.01) |
| *B25F 5/02* | (2006.01) |

(52) U.S. Cl.
CPC ............. *H02K 11/02* (2013.01); *B25F 5/02* (2013.01); *H02K 7/145* (2013.01); *H02K 23/66* (2013.01)

(58) Field of Classification Search
CPC ............................. H02K 11/02; H02K 7/145
See application file for complete search history.

(56) References Cited

U.S. PATENT DOCUMENTS

| | | | | | |
|---|---|---|---|---|---|
| 4,071,793 | A | * | 1/1978 | Cox | ........................ H02K 3/522 310/216.115 |
| 6,683,396 | B2 | * | 1/2004 | Ishida | ........................ B25F 5/00 310/130 |
| 8,587,168 | B2 | * | 11/2013 | Yamada | ................... F04B 35/04 310/43 |
| 2013/0000934 | A1 | | 1/2013 | Tadokoro et al. | |
| 2013/0133910 | A1 | | 5/2013 | Riedl et al. | |
| 2013/0162062 | A1 | | 6/2013 | Crosby et al. | |
| 2013/0162067 | A1 | | 6/2013 | Crosby et al. | |
| 2013/0162068 | A1 | | 6/2013 | Crosby et al. | |

FOREIGN PATENT DOCUMENTS

| | | |
|---|---|---|
| DE | 10 2005 057 642 A1 | 6/2007 |
| DE | 20 2010 006 837 U1 | 9/2011 |
| DE | 10 2011 087117 A1 | 5/2013 |
| EP | 2 489 478 A2 | 8/2012 |
| EP | 2 608 369 A2 | 6/2013 |
| JP | S59-232776 A | 12/1984 |
| JP | 2011-143499 A | 7/2011 |
| JP | 2012-139747 A | 7/2012 |
| JP | 2013-146812 A | 8/2013 |

OTHER PUBLICATIONS

Oct. 10, 2017 Office Action issued in Japanese Patent Application No. 2014-097688.
Aug. 21, 2017 Office Action issued in German Patent Application No. 10 2015 005 829.0.

* cited by examiner

*Primary Examiner* — Dang Le
(74) *Attorney, Agent, or Firm* — Oliff PLC (57) ABSTRACT

In an electric power tool, a stator of a motor is housed in a grip and the stator is located coaxial to the grip. An electric wire for the motor is passed through a ferrite core. Further, the ferrite core is located inside an outer peripheral surface of the stator in a radial direction.

13 Claims, 9 Drawing Sheets

ELECTRIC POWER TOOL

This application claims priority to Japanese patent application Serial Number 2014-97688, filed on May 9, 2014, the contents of which are incorporated herein by reference in their entirety.

BACKGROUND

Field

The present invention generally relates to an electric power tool in which a stator of a motor is housed and/or fixed coaxial to a grip. More particularly, embodiments disclosed herein relate to a positioning of a ferrite core used in at electric power tool.

Background Art

Japanese Laid-Open Patent Application No. 2011-143499 discloses that a ferrite core is located inside a housing in order to reduce electrical noises generated by electrical components in an electric power tool. The electric power tool disclosed in Japanese Laid-Open Patent Application No. 2011-143499 may have a main housing in which a motor, a speed reduction mechanism, etc., are housed and a grip protruding downward from a lower part of the main housing. The speed reduction mechanism may be housed in a front side of the main housing, and a chuck for mounting a tip tool to an output shaft, or a spindle, of the speed reduction mechanism may be located. Further, a motor may be housed in a rear side of the speed reduction mechanism, and a ferrite core may be located in the rear side of the motor. Further, a trigger-type switch for starting the motor may be located on the grip that may extend from the main housing.

In the above-mentioned electric power tool, the grip held by a user may be formed separatedly from the main housing in which the motor, the ferrite core, etc. are housed. Further, the trigger-type switch may be housed on the grip, but large electrical components may not be housed in the grip. Thus, in the above-mentioned electric power tool, a diameter of the grip may be appropriately reduced such that a used can easily hold the grip. However, in the case of an electric power tool such as, for example, a random orbital sander, in which a motor is housed inside the grip, the diameter dimension of the grip may become relatively large depending on a positioning of the ferrite core. Thus, handling and/or operation of the electric power tool may be deteriorated.

SUMMARY

In view of the above, it is desired to prevent an increase in the diameter of the grip of the electric power tool such that handling and/or operation of the electric power tool may not be deteriorated even when a ferrite core is housed inside the grip.

The present invention generally relates to an electric power tool where a stator of a motor is housed in a grip and located coaxial to the grip. An electric wire for the motor is passed through a ferrite core. Further, the ferrite core is located inside an outer peripheral surface of the stator in a radial direction.

Because of this construction, even in the case where the ferrite core is housed inside the grip, a diameter of the grip may not increase.

In an embodiment, the ferrite core is located such that an axis of the ferrite core is parallel to an axis of the motor or extends along a longitudinal direction of an inner wall surface of the grip. Thus, a housing space for housing the ferrite core may be easily obtained.

In an embodiment, the grip includes a first housing part in which the motor is housed and a second housing part in which an electrical component is housed. Further, the ferrite core is located in the second housing part.

In an embodiment, the electrical component includes a switch for starting or stopping the motor and a controller for controlling the motor. Further, an electric wire via which the motor is electrically connected to at least one of the switch and the controller is passed through the ferrite core. In this way, the electric wire via which the motor, which may be a possible noise source, is connected to the motor and a switch is passed through the ferrite core. Thus, the noise can be effectively and/or greatly reduced.

In an embodiment, the motor includes a coil of the stator and a rotor winding that is electrically connected to the coil through a brush and a commutator. Further, an electric wire via which the coil is connected to the brush is passed through the ferrite core. As a result, the ferrite core can be located near the brush, which may be a possible noise source, and/or the commutator, and thus the noise can be effectively and/or greatly reduced.

In an embodiment, an outer peripheral surface of the stator has substantially an elliptical shape that is vertically long and horizontally short when viewed from a direction perpendicular to an axis of the motor. Further, the ferrite core is located such that the ferrite core partially overlaps with either one of an upper left, an upper right, a lower left, or a lower right corner of the stator in a radial direction.

In an embodiment, a support part for supporting the ferrite core is located in the second housing part. Further, the support part includes a right side vertical rib for supporting a right side of the ferrite core, a left side vertical rib for supporting a left side of the ferrite core, and a bottom plate for supporting a lower side or an upper side of the ferrite core at a base end of the right and left side vertical ribs. Further, a protruding length of the left side vertical rib differs from that of the right side vertical rib when viewed from a direction perpendicular to an axis of the grip.

In an embodiment, the right side vertical rib and the left side vertical rib are located on an inner side of the outer peripheral surface of the stator in the radial direction when viewed from the direction perpendicular to the axis of the grip. Because of this construction, the support part may not be an obstacle to the grip, and a diameter of the grip may be minimized as much as possible.

In an embodiment, the protruding lengths of the left side vertical rib and the right side vertical rib are configured such that the left side vertical rib and the right side vertical rib extend to the outer peripheral surface of the stator.

In an embodiment, the second housing part is covered with a tubular cover member. Because of this construction, dustproof, waterproof, and/or insulation of the electric power tool can be securely obtained.

In an embodiment, a protrusion is located on an inner wall surface of the cover member such that the ferrite core supported by the support part of the second housing part is pressed by the protrusion from an opposite side of the bottom plate of the support part. As a result, a rattling of the ferrite core can be reduced and eventually the ferrite core may not be easily broken.

In an embodiment, a hooked part is located in the right side vertical rib or the left side vertical rib to press the ferrite core from the opposite side of the bottom plate. Because of this construction, a rib etc. may not be necessary to locate on the inner wall surface of the cover member.

In an embodiment, a capacitor is located between the switch and the controller to reduce noise. Thus, the capacitor can be housed while the diameter of the grip can be minimized as much as possible.

In an embodiment, even when the ferrite core is housed inside the grip to reduce the electrical noises, the grip may not be large. Thus, handling and/or operation of the electric power tool may not be deteriorated. Additional features and advantages of the present invention are described in, and will be apparent from, the detailed description of the presently preferred embodiments and from the drawings.

The detailed description set forth below, when taken in connection with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring the novelty of the exemplary embodiments presented herein.

DETAILED DESCRIPTION

Referring now to the drawings wherein like numerals refer to like parts, FIGS. 1-12 generally illustrate an electric power tool 10 in accordance with embodiments of the present invention. The electric power tool 10 may be a random orbital sander 10 for polishing wood and/or metal. In detail, the random orbital sander 10 may be configured to polish a material by rotating a disc-shaped polishing disc with eccentric movement. Terms such as "front", "rear", "left", and/or "right" as used in the description below to indicate position, orientation and/or direction may be relative to the position of the random orbital sander.

Figure 1:
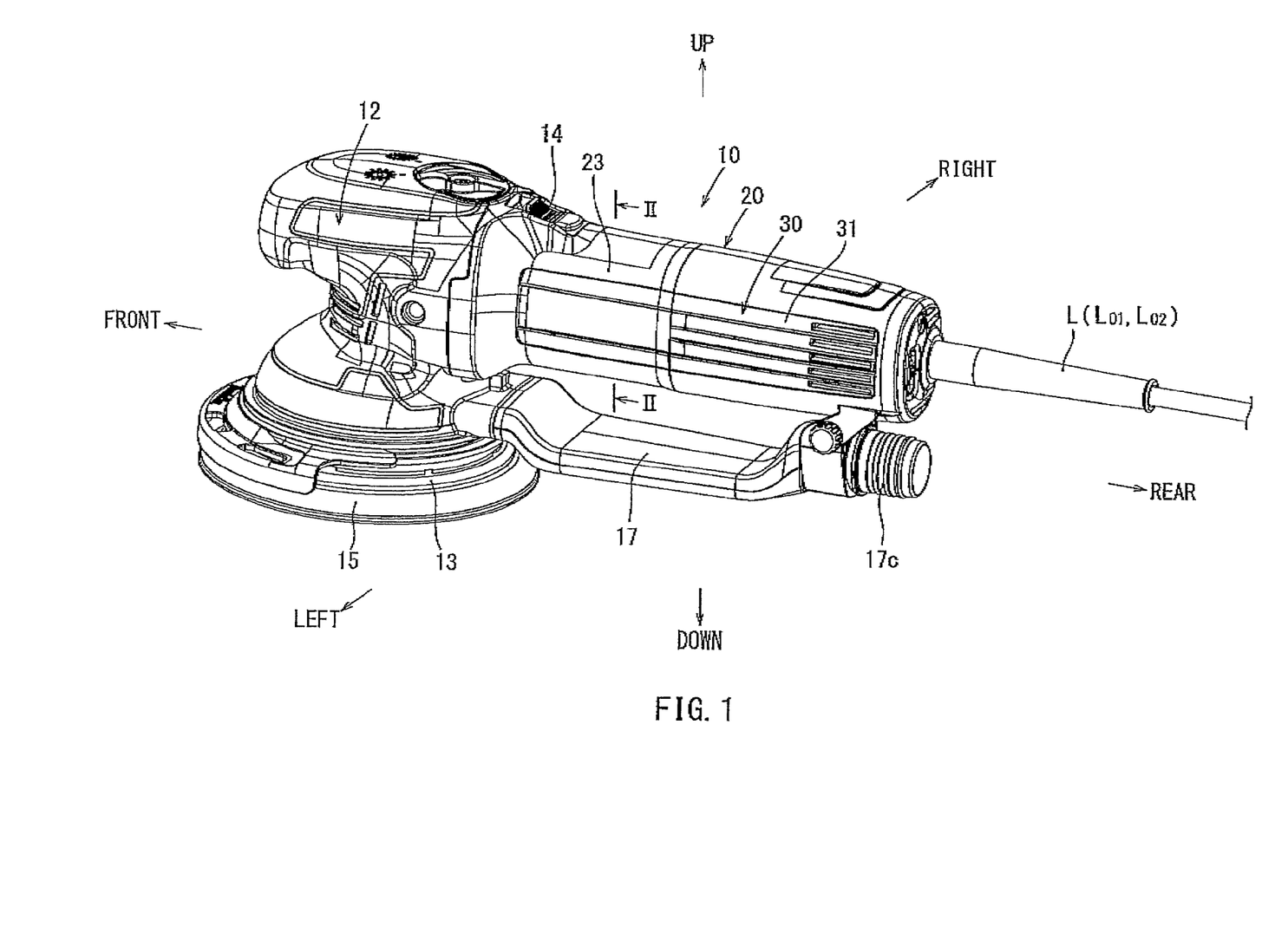
FIG. 1 illustrates an overall perspective view of an electric power tool such as a random orbital sander in accordance with an embodiment of the present invention.

As shown in FIG. 1, the random orbital sander 10 may have a celled cylindrical-shaped main housing 12 and a grip 20 protruding backward from an upper side of the main housing 12. Further, the random orbital sander 10 may have a dust-collecting rectangular tube 17 protruding backward from a lower side of the main housing 12. A rear end part of the dust-collecting rectangular tube 17 may be suspendedly supported by a rear end part of the grip 20.

As shown in FIG. 1, a disc-shaped base 13 configured to perform a rotation movement and an eccentric movement may be located at a lower end of the main housing 12, and a disc-shaped polishing disc 15 may be mounted coaxial to the base 13. Further, a gear mechanism (not shown in the FIGS.), which may receive a rotational force from a motor 25 (refer to FIGS. 2 and 3) to cause the base 13 to perform a rotation movement and an eccentric movement, may be located inside the main housing 12. Further, a dust collection chamber (not shown in the FIGS.) may be located inside a lower part of the main housing 12. The dust collection chamber may communicate with the dust-collecting rectangular tube 17. By connecting a connector 17c located at the rear end part of the dust-collecting rectangular tube 17 to a dust collector (not shown in the FIGS.), polishing chips may be taken in during a polish operation.

A user of the random orbital sander 10 may hold the grip 20. As shown in FIG. 1, the grip 20 may have a first housing part 23 that is linked to the main housing 12 and a second housing part 30 extending from the first housing part 23. Further, a switch operating part 14 for turning on/off a main switch 41, which is described later, may be located on an upper surface area between the first housing part 23 and the main housing 12 such that the main switch 41 may slide in a longitudinal direction.

Figure 2:
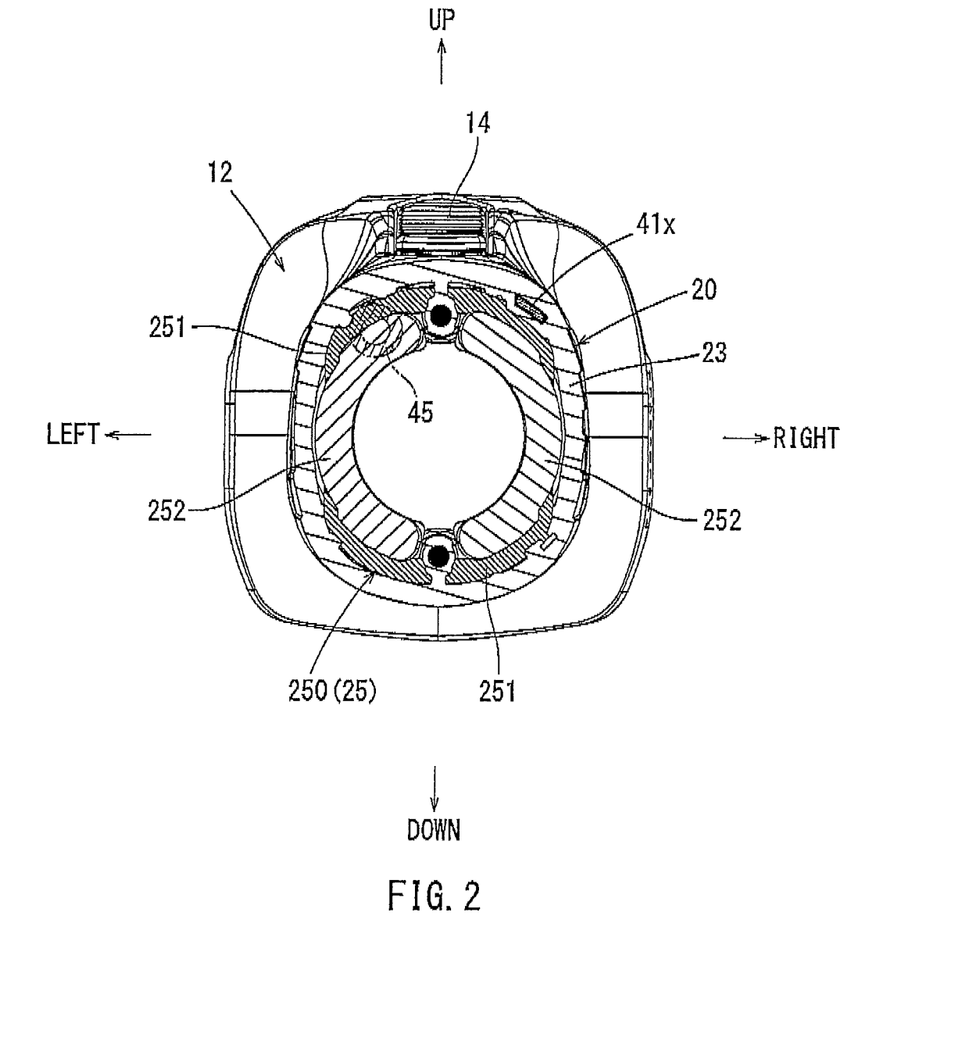
FIG. 2 illustrates a sectional view perpendicular to a longitudinal axis of a grip (a first housing part) of a random orbital sander viewed along line II-II of FIG. 1.
Figure 3:
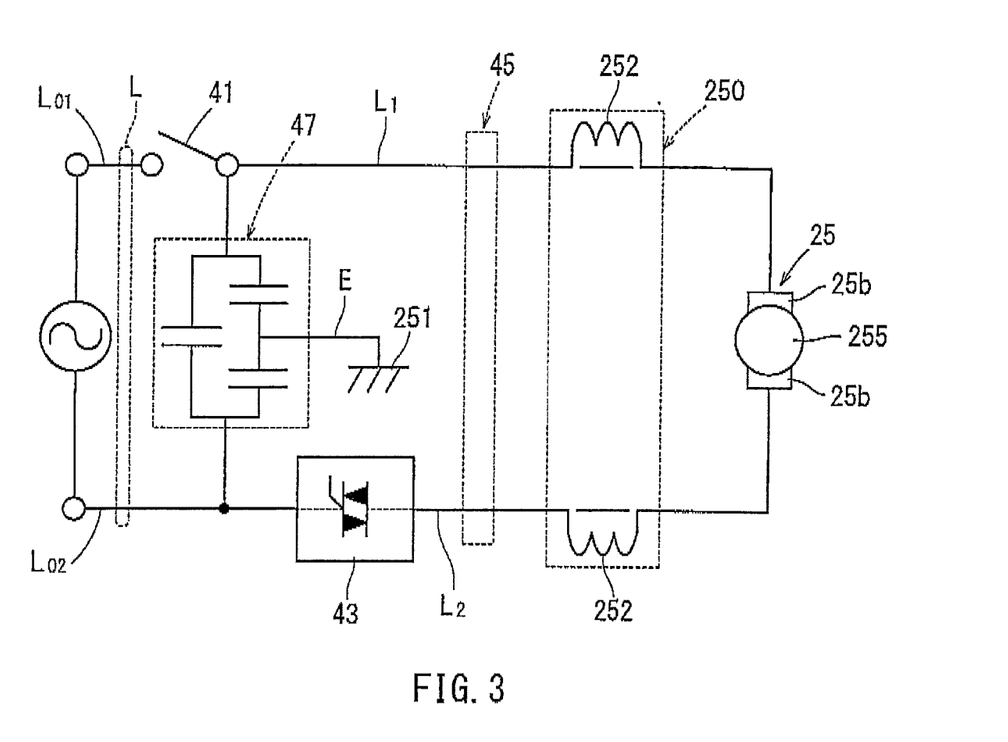
FIG. 3 illustrates a schematic diagram of an electric circuit of the random orbital sander.

Referring now to FIGS. 1 and 2, the motor 25 may be housed in the first housing part 23 of the grip 20 in a longitudinal direction. As shown in FIG. 2, the motor 25 may have a tubular stator 250 and a rotor 255. Referring to FIG. 3, the rotor 255 (not shown in FIG. 2) may be housed in the stator. Further, a rotation shaft of the rotor 255 may be linked to the above-mentioned gear mechanism housed in the main housing 12 to transmit rotation movement. Accordingly, when the motor 25 starts, the gear mechanism may be driven, and the base 13 and the polishing disc 15 may perform a rotational movement and an eccentric movement.

As shown in FIG. 2, the stator 250 of the motor 25 may have a stator core 251 and a pair of coils 252. The stator core 251 may be formed of steel plates in a tubular shape and have a pair of magnetic poles (not in the FIGS.) on an inner peripheral surface thereof. The stator core 251 of the stator 250 may be electrically connected to a ground line of a power source. The pair of coils 252 may be wound around the magnetic poles of the stator core 251. The outer peripheral surface of the stator core 251, i.e. the outer peripheral surface of the stator 250, may have an elliptical configuration when viewed from a direction perpendicular to a longitudinal axis of the stator 250. In more detail, a cross section of the stator core 251 may be vertically long and horizontally short. The stator 250 may be fixed to the first housing part 23 such that the outer peripheral surface of the stator 250 may be engaged with an inner wall surface of the first housing part 23 of the grip 20. In this way, the first housing part 23 of the grip 20 may be formed such that the cross section of the first housing part 23 may have substantially an elliptical configuration that is vertically long and horizontally short. Thus, a user may easily hold the grip 20.

Referring now to FIG. 3, the second housing part 30 of the grip 20 may house electrical components for driving the motor 25. The electrical components may include a main switch 41, a controller 43, a ferrite core 45 to reduce noises, and a capacitor 47, etc. As shown, for example, in FIGS. 1 and 4, the second housing part 30 may have a support part 33 for supporting the electrical components on the inner side of the grip 20, and a tubular cover 31 for covering the support part 33. Further, as shown in FIG. 1, the cover 31 may be configured not only to cover the support part 33 but also such that an outer peripheral design surface of the cover 31 may be continuous with an outer peripheral design surface of the first housing part 23. In this way, the cover 31 may form the grip 20 together with the first housing part 23.

FIG. 3 shows an electrical circuit for driving the motor 25. The main switch 41 may be configured to start or stop the motor 25 in accordance with an on/off operation of the switch operating part 14. As shown in FIG. 3, a power line L01 of a power cable L may be connected to a terminal of the main switch 41, and an electric wire L1, which may be connected to a coil 252 of the motor 25, may be connected to the other terminal of the main switch 41. Further, as shown in FIG. 3, a coil 252 of the motor 25 may be connected to a winding (not shown in the FIGS.) of the rotor 255 via a brush 25*b* and a commutator (not shown in the FIGS.), and the other end of the winding may be connected to the other coil 252 via a commutator and the other brush 25*b*. The electric wire L2 connected to the other coil 252 of the motor 25 may be connected to a terminal of the controller 43 that may be a switching element. The other power line L02 of the power cable L may be connected to the other terminal of the controller 43. The controller 43 may control a rotational speed of the motor 25. In more detail, referring to FIGS. 5 to 7, the controller 43 may be configured to control the rotational speed of the motor 25 based on a signal from a speed adjustment dial 43*e* (not shown in FIG. 3).

As shown in FIG. 3, the main switch 41, the motor 25, and the controller 43 may be connected to the power lines L01 and L02 of the AC power source in series. Further, the electric wire L1 between the main switch 41 and the motor 25 and the electric wire L2 between the controller 43 and the motor 25 may be passed through the ferrite core 45 to reduce a possible noise generated by the motor 25. The ferrite 45 may be made of, for example, ferrite in a tubular shape, and may be configured to absorb and/or reduce a high-frequency noise. Further, one terminal of a capacitor 47 for reducing noises may be connected to one terminal of the main switch 41, and the other terminal of the capacitor 47 may be connected to the power line L02 of the power cable L. That is, the capacitor 47 may be connected in parallel with a serial circuit of the motor 25 and the controller 43. Further, a grounding terminal E of the capacitor 47 may be connected to the stator core 251 of the motor 25.

Figure 4:
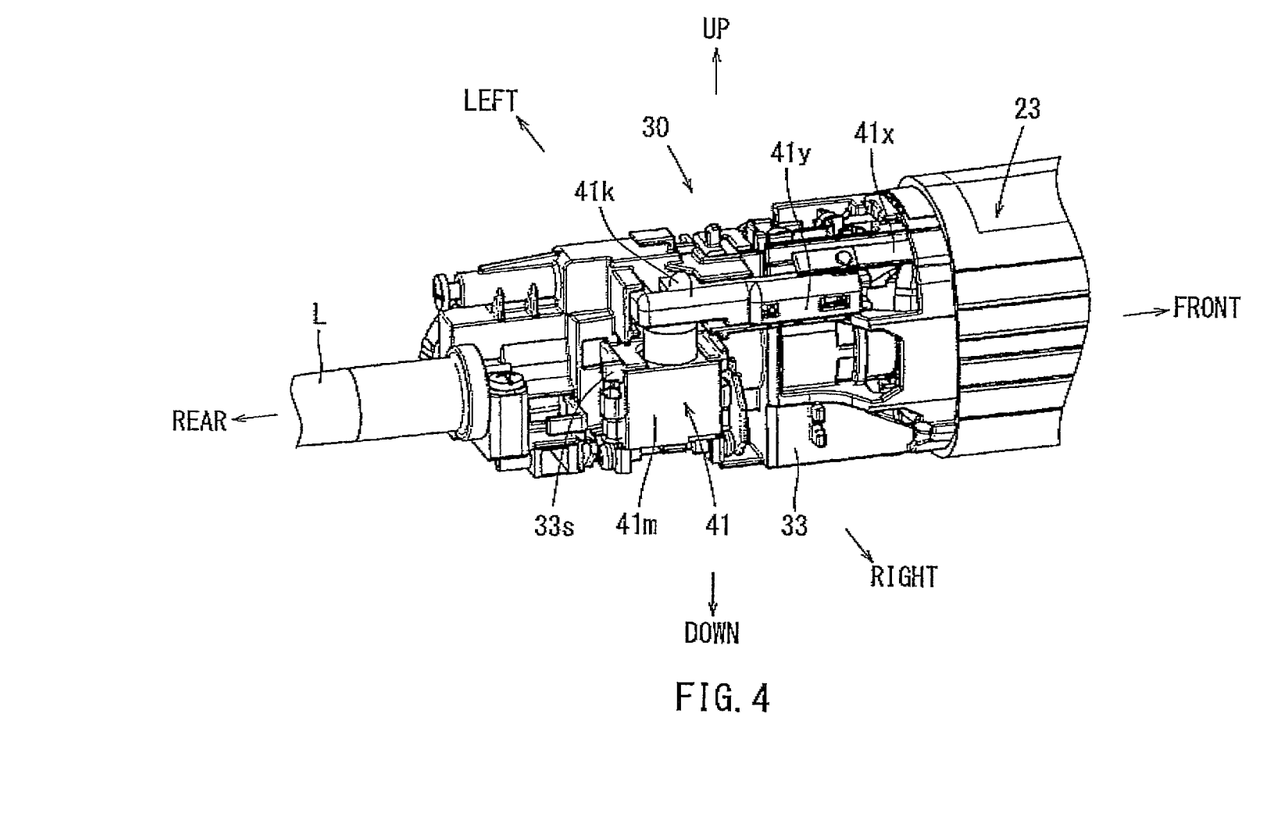
FIG. 4 illustrates a perspective view of a second housing part of the grip with a cover removed, viewed obliquely from a right-upper rear side.

As shown in, for example, FIG. 4, the main switch 41 may be located at a right rear part of the second housing part 30 such that the main switch 41 may be supported by a switch support part 33*s* of the support part 33 of the second housing part 30. The main switch 41 may have a main body 41*m* in the form of a box with a small width and a moving part 41*k* configured to locate on the main body 41*m* protruding upward. Further, as shown in FIG. 4, the main switch 41 may be supported by the switch supporting part 33*s* of the second housing part 30 such that the main switch 41 may be located in parallel with an axis of the motor 25 in a longitudinal direction thereof and protrude perpendicular to the axis in a width direction thereof. Further, as shown in FIG. 4 and FIG. 1, the moving part 41*k* of the main switch 41 may be connected to the switch operating part 14 located on the outer side of the grip 20 via a second operation lever 41*y* and a first operation lever 41*x*. As shown in FIG. 4, the second operation lever 41*y* and the first operation lever 41*x* may be located in parallel with the axis of the motor 25, and the rear end part of the second operation lever 41*y* may be connected to the moving part 41*k* of the main switch 41. Further, the front end part of the second operation lever 41*y* may be connected to the rear end part of the first operation lever 41*x*, and the front end part of the first operation lever 41*x* may be connected to the switch operating portion 14. Because of this construction, an operation of the switch operating part 14 may be transmitted to the moving part 41*k* via the first operation lever 41*x* and the second operation lever 41*y*, and the main switch 41 may be turned on or off. The main switch 41 may correspond to a switch of the present embodiment.

Figure 5:
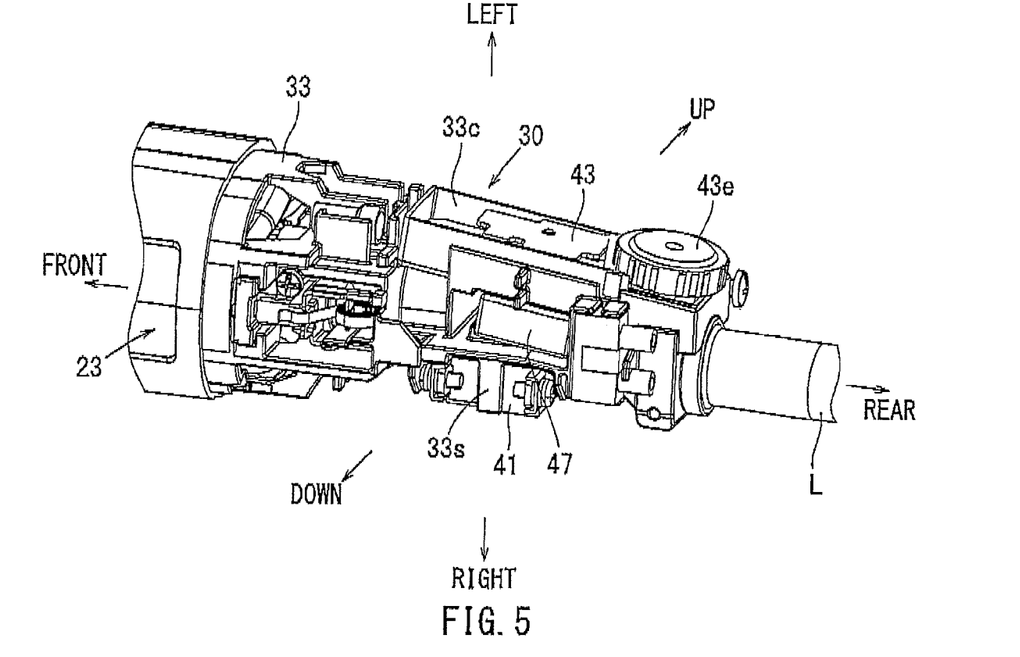
FIG. 5 illustrates a perspective view of a second housing part of the grip with a cover removed, viewed obliquely from the lower left.
Figure 6:
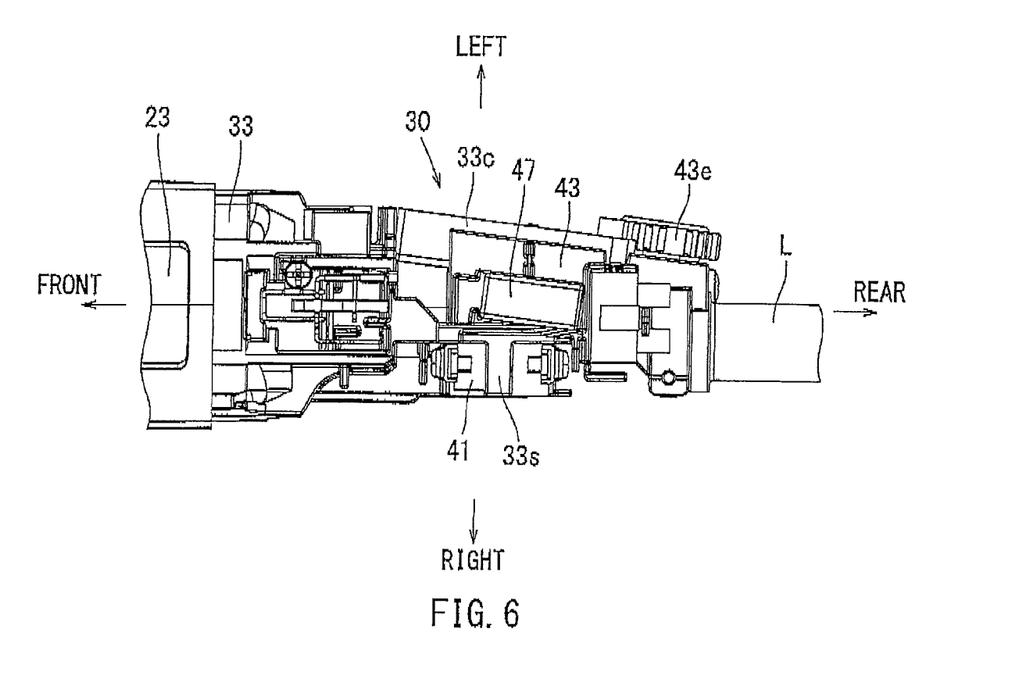
FIG. 6 illustrates a plan view of a second housing part of the grip with a cover removed, viewed from below.
Figure 7:
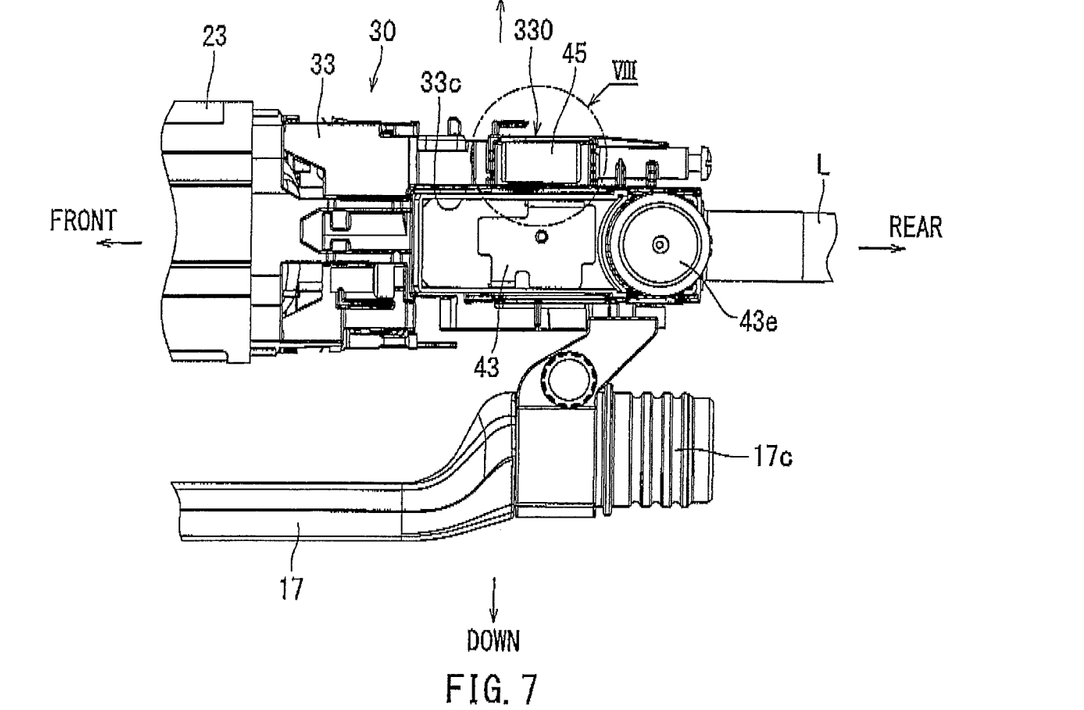
FIG. 7 illustrates a side view of a second housing part of the grip, with a cover removed.

As shown in FIGS. 5 to 7, the controller 43 may be located at a rear left of the second housing part 30, or on the opposite side of the main switch 41, such that the controller 43 may be supported by a controller supporting part 33*c* of the support part 33 of the second housing part 30. The controller 43 may be located on the front side of the speed adjustment dial 43*e* as shown in for example, FIG. 5. Further, as clearly shown in FIG. 6, the controller 43 may be supported by the controller supporting part 33*c* such that the controller 43 may be located to be inclined in the right and left direction and a distance from the main switch 41 may be relatively large on the front side and relatively small on the rear side. Further, the thin box-shaped capacitor 47 for reducing noises may be located between the controller 43 and the main switch 41.

Figure 8:
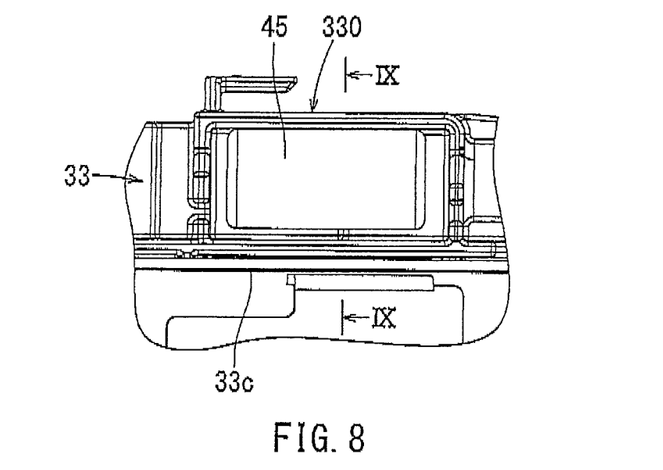
FIG. 8 illustrates an enlarged view of a part encircled by dashed lines indicated by an arrow VIII of FIG. 7.
Figure 9:
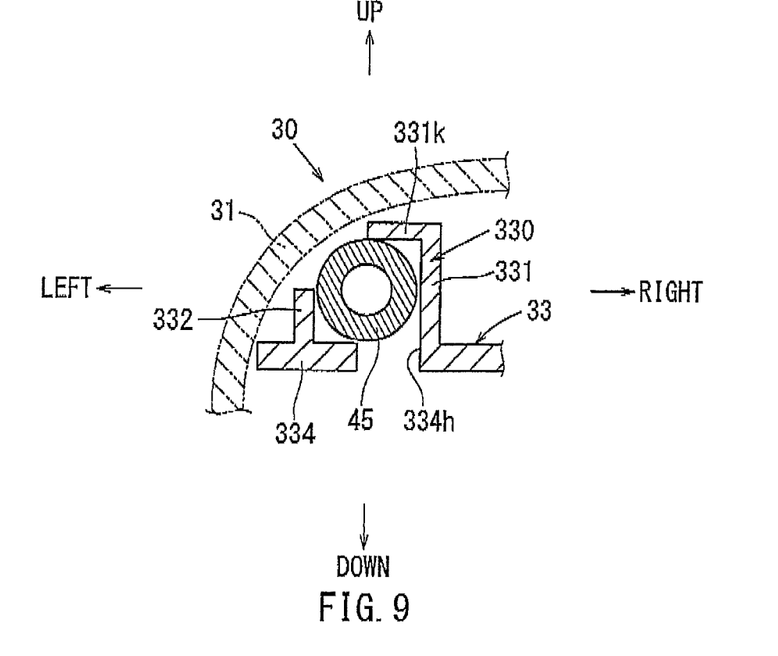
FIG. 9 illustrates a sectional view of a ferrite core support structure viewed along line IX-IX of FIG. 8.

As shown in FIGS. 7 and 8, the ferrite core 45 may be supported and/or housed in a ferrite core supporting part 330 that may be located above the controller supporting part 33*c* of the support part 33. As shown in FIG. 9, the ferrite supporting part 330 may have a left side vertical rib 332, a right side vertical rib 331, and a bottom plate 334, which may support the outer peripheral surface of the ferrite core 45 from the left, from the right, and from below, respectively. Further, a hooked part 331*k* for pressing the outer peripheral surface of the ferrite core 45 from above may be located at an upper end of the right side vertical rib 331 of the ferrite supporting part 330. Further, an opening 334*h* through which a mold for molding the hooked part 331*k* of the right side vertical rib 331 is passed may be formed in the bottom plate 334 of the ferrite supporting part 330.

As shown in FIG. 7, the ferrite core 45 may be located such that the ferrite core 45 may be supported by the ferrite supporting part 330 and an axis of the ferrite core 45 may extend in the front-rear direction of the grip 20 along the controller 43. Accordingly, the ferrite core 45 may be configured to locate along the longitudinal direction of an inner wall surface of the cover 31. Further, the ferrite core 45 may be slightly inclined in the right and left direction with respect to the axis of the motor 25, similar to the controller 43. Further, as indicated by dashed lines in FIG. 2, the ferrite core 45 may be located on an inner side of the outer peripheral surface of the stator 250 of the motor 25 in a radial direction such that the ferrite core 45 may be supported by the ferrite supporting part 330 and partially overlapped with an upper left corner of the stator 250 in an axial direction. The left side vertical rib 332 and the right side vertical rib 331 of the ferrite supporting part 330 may be configured such that, when viewed from a direction perpendicular to the axis of the grip 20, the vertical ribs 331 and 332 may extend to the outer peripheral surface of the stator 250 of the motor 25. In other words, as shown in FIG. 9, the left side vertical rib 332 may be configured to be smaller than the right side vertical rib 331 in height, and the upper ends of the vertical ribs 332 and 331 may extend to the inner wall surface of the cover 31 when the cover 31 covers the support part 33 of the second housing part 30.

In the random orbital sander 10 according to the present embodiment, the ferrite core 45 may be located in the grip, or the second housing part 30, on the inner side of the outer peripheral surface of the stator 250 of the motor 25. Thus, even when the ferrite core 45 is housed in the grip, the diameter of the grip 20 may not be increased.

Further, the ferrite core 45 may be located to be slightly inclined with respect to the axis of the motor 25. Because of this construction, a space for housing the ferrite core 45 may be easily obtained. Further, the electric wire, via which the motor 25, which may be a possible noise source, may be connected to the main switch 41 and the controller 43, may be passed through the ferrite core 45. Because of this construction, the noises generated by the motor 25 may be efficiently and/or greatly reduced.

Further, when viewed from a direction perpendicular to the axis of the grip 20, the left and right vertical ribs 332 and 331 may be configured such that the upper end of the right side vertical rib 331 and the upper end of the left side vertical rib 332 of the ferrite support portion 330 may extend to the outer peripheral surface of the stator 250. Because of this construction, the ferrite supporting part 330, or the support part 33, may not be an obstacle to the configuration of the grip 20, and the diameter of the grip may be minimized as much as possible.

Further, the capacitor 47 may be located in the second housing part 30 at a position where the capacitor 47 may be held between the main switch 41 and the controller 43. Because of this construction, the diameter of the grip 20 may be minimized as much as possible with the capacitor 47 housed in the grip 20.

Figure 10:
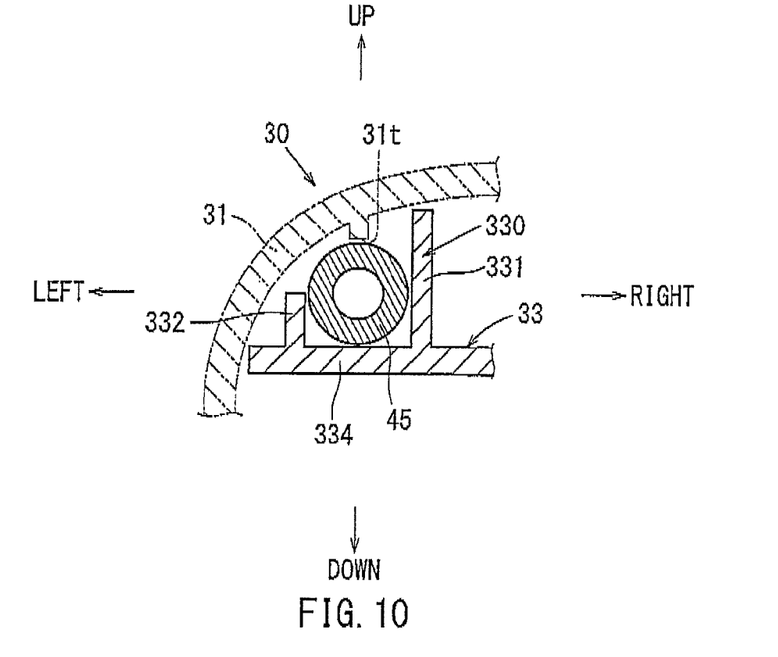
FIG. 10 illustrates a sectional view of a ferrite core support structure in accordance with another embodiment.

It should be understood that various changes and modifications to the presently preferred embodiments described herein will be apparent to those skilled in the art. Such changes and modifications may be made without departing from the spirit and scope of the present invention and without diminishing its attendant advantages. In the present embodiment described above, the hooked part 331k pressing the outer peripheral surface of the ferrite core 45 from above may be located at the upper end of the right side vertical rib 331 of the ferrite core supporting part 330, as shown in FIG. 9. However, as shown in FIG. 10, it may be possible to form the right side vertical rib 331 of the ferrite supporting part 330 in a plate-shaped configuration similar to the left side vertical rib 332, and to form a rib 31t on the inner wall surface of the cover member 31 such that the rib 31t may press the outer peripheral surface of the ferrite core 45 from above.

Figure 11:
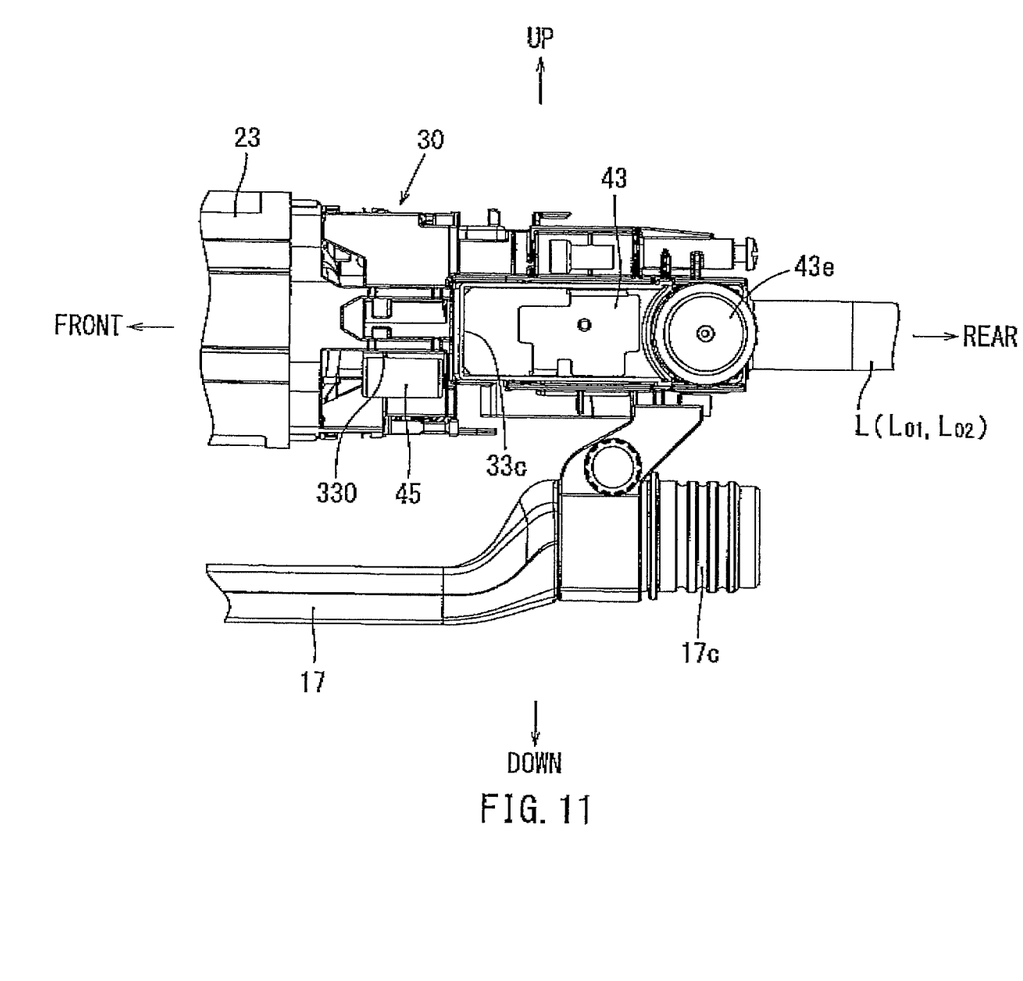
FIG. 11 illustrates a side view of a second housing part in the grip of a random orbital sander with a cover removed in accordance with another embodiment.

Further, in the present embodiment described above, the ferrite core 45 may be housed in the ferrite core supporting part 330 located in the upper side of the controller supporting part 33c of the second housing part 30 (the support part 33), and the ferrite core 45 may be located at a position where the ferrite core 45 may be partially overlapped with the upper left corner of the stator 250 of the motor 25 in the axial direction. However, it may be possible to locate the ferrite core 45 at an upper right, a lower left, or a lower right corner of the stator 250 of the motor 25. Further, instead of locating the ferrite core supporting part 330 on the upper side of the controller supporting part 33c, it may be possible to locate the ferrite core supporting portion 330 at a front side of the lower part of the controller supporting part 33c and to house the ferrite core 45 therein, as shown in FIG. 11. Because of this construction, the ferrite core 45 may be located in the vicinity of the motor 25, and the noises generated by the motor 25 may be efficiently reduced and/or absorbed by the ferrite core 45. When the ferrite core supporting part 330 is located at the front side of the lower part of the controller supporting part 33c, it may be desirable to locate the ferrite core 45 parallel to the axis of the motor 25.

Figure 12:
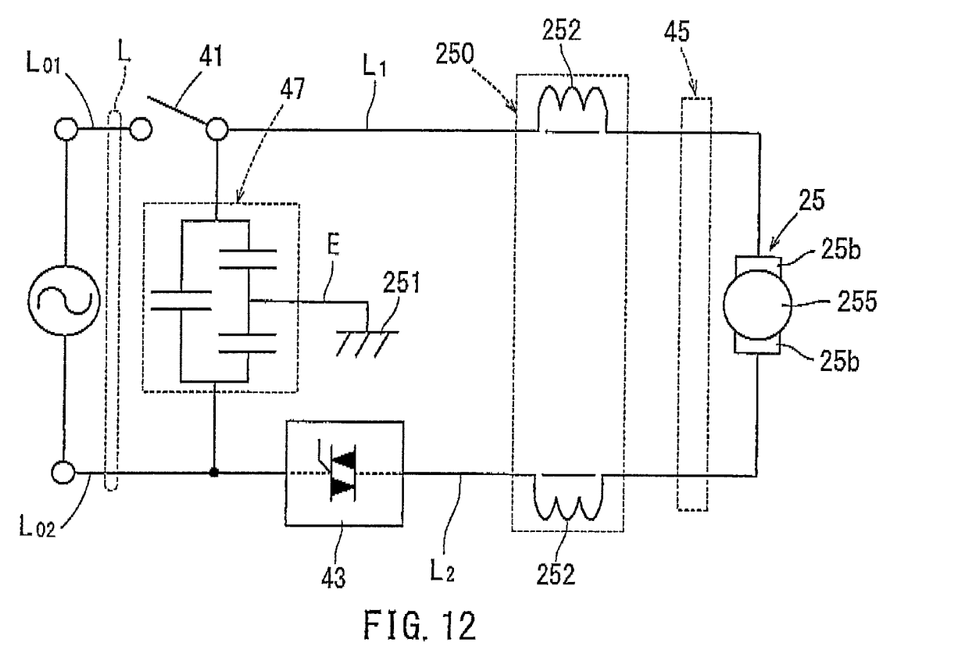
FIG. 12 illustrates a schematic diagram of an electric circuit of the random orbital sander in accordance with another embodiment.

Further, in the present embodiment as described above, the electric wire L1 between the main switch 41 and the motor 25 and the electric wire L2 between the controller 43 and the motor 25 may be passed through the ferrite core 45, as shown in FIG. 3. However, as shown in FIG. 12, it may be possible that the electric wire between one coil 252 and the brush 25b of the motor 25 and the electric wire between the other coil 252 and the brush 25b may be passed through the ferrite core 45. Because of this construction, the ferrite core 45 may be located in the vicinity of the brush and the commutator, which may be possible noise sources, and accordingly the noises generated by the motor 25 may be efficiently and greatly reduced and/or absorbed by the ferrite core 45. Further, in the present embodiment as described above, the random orbital sander 10 is shown as the electric power tool, but any other electric power tools in which a stator of the motor is fixedly housed and/or located coaxial to the grip, such as an electric driver, may be applicable to the present invention.

What is claimed is:

1. An electric power tool comprising:
   a grip being a portion of the electric power tool that is configured to be gripped by a user in order to operate the electric power tool;
   a stator of a motor is housed in the grip and located coaxial to the grip, the stator comprising a stator core, wherein:
   an electric wire for the motor is passed through a ferrite core; and
   the ferrite core is located inside an outer peripheral surface of the stator in a radial direction.

2. The electric power tool of claim 1, wherein the ferrite core is located such that an axis of the ferrite core is parallel to an axis of the motor or extends along a longitudinal direction of an inner wall surface of the grip.

3. The electric power tool of claim 1, wherein:
   the grip includes a first housing part in which the motor is housed and a second housing part in which an electrical component is housed; and
   the ferrite core is located in the second housing part.

4. The electric power tool of claim 1, wherein:
   the electrical component includes a switch for starting or stopping the motor and a controller for controlling the motor; and
   an electric wire via which the motor is electrically connected to at least one of the switch and the controller is passed through the ferrite core.

5. The electric power tool of claim 1, wherein:
   the motor includes a coil of the stator and a rotor winding that is electrically connected to the coil through a brush and a commutator; and
   an electric wire via which the coil is connected to the brush is passed through the ferrite core.

6. The electric power tool of claim 1, wherein:
an outer peripheral surface of the stator has substantially an elliptical shape that is vertically long and horizontally short when viewed from a direction perpendicular to an axis of the motor; and
the ferrite core is located such that the ferrite core partially overlaps with either one of an upper left, an upper right, a lower left, or a lower right corner of the stator in a radial direction.

7. The electric power tool of claim 6, wherein:
a support part for supporting the ferrite core is located in the second housing part and further wherein the support part includes a right side vertical rib for supporting a right side of the ferrite core, a left side vertical rib for supporting a left side of the ferrite core, and a bottom plate for supporting a lower side or an upper side of the ferrite core at a base end of the right and left side vertical ribs; and
a protruding length of the left side vertical rib differs from that of the right side vertical rib when viewed from a direction perpendicular to an axis of the grip.

8. The electric power tool of claim 7, wherein the right side vertical rib and the left side vertical rib ate located on an inner side of the outer peripheral surface of the stator in the radial direction when viewed from the direction perpendicular to the axis of the grip.

9. The electric power tool of claim 7, wherein the protruding lengths of the left side vertical rib and the right side vertical rib are configured such that the left side vertical rib and the right side vertical rib extend to the outer peripheral surface of the stator.

10. The electric power tool of claim 7, wherein the second housing part is covered with a tubular cover member.

11. The electric power tool of claim 10, wherein a protrusion is located on an inner wall surface of the cover member such that the ferrite core supported by the support part of the second housing part is pressed by the protrusion from an opposite side of the bottom plate of the support part.

12. The electric power tool of claim 7, wherein a hooked part is located in the right side vertical rib or the left side vertical rib to press the ferrite core from an opposite side of the bottom plate.

13. The electric power tool of claim 1, wherein a capacitor is located between the switch and the controller to reduce noise.

* * * * *